US007516398B2

(12) United States Patent
Yang

(10) Patent No.: US 7,516,398 B2
(45) Date of Patent: Apr. 7, 2009

(54) APPARATUS AND METHOD OF EXECUTING MULTI-CLIPBOARD

(75) Inventor: Hye-won Yang, Bucheon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 706 days.

(21) Appl. No.: 10/743,313

(22) Filed: Dec. 23, 2003

(65) Prior Publication Data

US 2004/0230907 A1 Nov. 18, 2004

(30) Foreign Application Priority Data

Dec. 24, 2002 (KR) .................... 10-2002-0083176

(51) Int. Cl.
*G06F 17/24* (2006.01)
*G06F 17/21* (2006.01)
(52) U.S. Cl. ................ 715/230; 715/724; 715/770; 715/764; 709/205
(58) Field of Classification Search ............... 715/530, 715/230, 724, 764, 770
See application file for complete search history.

(56) References Cited

U.S. PATENT DOCUMENTS

| 5,261,080 | A | * | 11/1993 | Khoyi et al. ............... 710/65 |
| 5,301,268 | A | * | 4/1994 | Takeda ..................... 719/329 |
| 5,404,436 | A | * | 4/1995 | Hamilton .................. 345/472 |
| 5,404,442 | A | * | 4/1995 | Foster et al. ............... 715/769 |
| 5,559,942 | A | * | 9/1996 | Gough et al. .............. 715/802 |
| 5,659,791 | A | * | 8/1997 | Nakajima et al. ........... 715/539 |
| 5,689,666 | A | * | 11/1997 | Berquist et al. ............ 715/797 |
| 5,734,905 | A | * | 3/1998 | Oppenheim ............... 719/315 |
| 5,737,737 | A | * | 4/1998 | Hikida et al. ............. 707/104.1 |
| 5,765,156 | A | * | 6/1998 | Guzak et al. .............. 707/100 |
| 5,781,192 | A | * | 7/1998 | Kodimer ................... 715/770 |
| 5,801,693 | A | * | 9/1998 | Bailey ....................... 715/769 |
| 5,897,650 | A | * | 4/1999 | Nakajima et al. ........... 715/539 |
| 5,903,269 | A | * | 5/1999 | Poreh et al. ................ 715/804 |
| 5,924,099 | A | * | 7/1999 | Guzak et al. ............... 707/100 |
| 5,991,441 | A | * | 11/1999 | Jourjine ..................... 382/187 |
| 6,094,197 | A | * | 7/2000 | Buxton et al. .............. 715/863 |
| 6,097,391 | A | * | 8/2000 | Wilcox ....................... 715/776 |

(Continued)

FOREIGN PATENT DOCUMENTS

KR     2000-0014601 A     3/2000

(Continued)

OTHER PUBLICATIONS

Wikipedia.org et al. "Clipboard Manager" 2007.*

(Continued)

*Primary Examiner*—Steven B Theriault
(74) *Attorney, Agent, or Firm*—Sughrue Mion, PLLC

(57) ABSTRACT

Provided are an apparatus and method of executing a multi-clipboard. In order to execute the multi-clipboard, it is determined whether a predetermined amount of time has passed after a paste is activated. Then data stored in a basic clipboard is pasted if a signal indicating a user's selection to paste is received before the predetermined amount of time has passed. If the predetermined amount of time has passed, data stored in a multi-clipboard is displayed. As such, it is possible to support a user-friendly multi-clipboard function based on a general clipboard without the need for additional software or hardware.

5 Claims, 8 Drawing Sheets

U.S. PATENT DOCUMENTS

| | | | | |
|---|---|---|---|---|
| 6,151,611 | A * | 11/2000 | Siegel | 715/541 |
| 6,177,939 | B1 * | 1/2001 | Blish et al. | 715/770 |
| 6,249,283 | B1 * | 6/2001 | Ur | 715/764 |
| 6,269,389 | B1 * | 7/2001 | Ashe | 718/100 |
| 6,675,213 | B1 * | 1/2004 | Schmonsees | 709/225 |
| 6,803,929 | B2 * | 10/2004 | Hinegardner et al. | 715/769 |
| 6,961,907 | B1 * | 11/2005 | Bailey | 715/770 |
| 6,986,105 | B2 * | 1/2006 | Walker, Jr. | 715/531 |
| 7,146,571 | B2 * | 12/2006 | Bates et al. | 715/770 |
| 2002/0080179 | A1 * | 6/2002 | Okabe et al. | 345/769 |
| 2002/0143985 | A1 * | 10/2002 | Goldstein | 709/238 |
| 2003/0076359 | A1 * | 4/2003 | Martinez et al. | 345/770 |
| 2003/0154207 | A1 * | 8/2003 | Naito | 707/100 |
| 2003/0182388 | A1 * | 9/2003 | Alexander et al. | 709/213 |
| 2003/0225758 | A1 * | 12/2003 | Yamasaki | 707/3 |
| 2004/0039995 | A1 * | 2/2004 | Kuwata et al. | 715/530 |

FOREIGN PATENT DOCUMENTS

KR    2001-0045591 A    6/2001

OTHER PUBLICATIONS xrayz software et al. "ClipcachePro" Jan. 1998 http://ww.xrayz.co.uk/clipcache/?page=versions.*

Nueburg, Matt et al. "CopyPaste: a Scoffer No More" 1997 http://db.tidbits.com/article/751&print_version=1.*

* cited by examiner

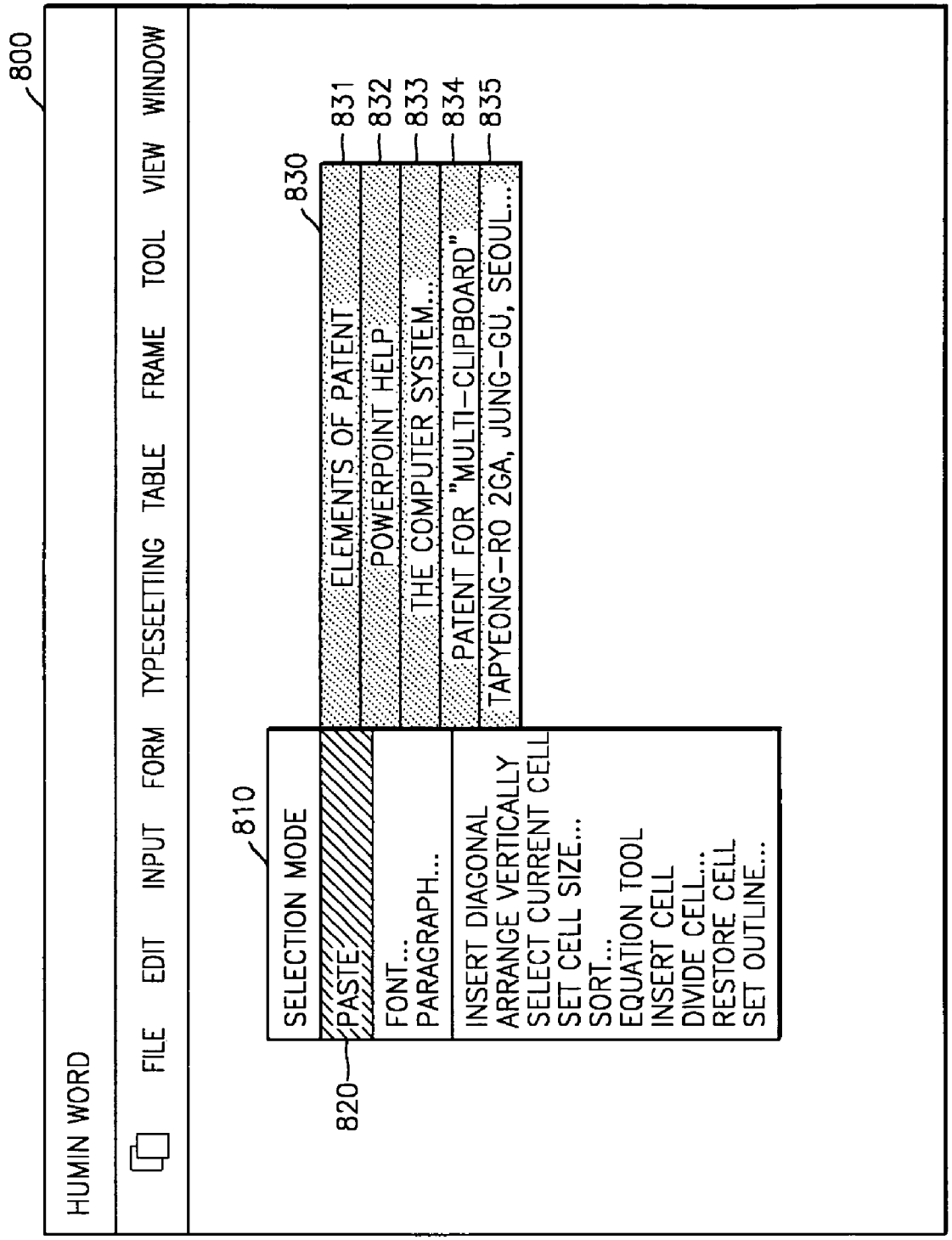

US 7,516,398 B2

APPARATUS AND METHOD OF EXECUTING MULTI-CLIPBOARD

CROSS REFERENCE TO RELATED APPLICATION

This application claims the priority of Korean Patent Application No. 2002-83176, filed on 24 Dec. 2002 in the Korean Intellectual Property Office, the disclosure of which is hereby incorporated by reference in its entirety.

BACKGROUND OF THE INVENTION

1. Field of the Invention

The present invention relates to an apparatus and method of executing a clipboard by which copy, cut, and paste operations are implemented in various editing programs, and more particularly, to an apparatus and method of executing a multi-clipboard.

2. Description of the Related Art

In WINDOWS operating systems, there is a special memory resource, a clipboard, for application programs. The clipboard stores a copy of data that was copied or cut from a current text, so that a user can paste the copy to the current or another text.

The clipboard is a region in a memory used by WINDOWS for temporary storage when data is copied or pasted from a program to another. In a WINDOWS or APPLE MACINTOSH operating system, the clipboard can be used to copy data from a program to another. For example, the clipboard is used to implement a cut, copy, or paste operation in a WINDOWS application such as a word processor or EXCEL.

A clipboard displayer displays data that was copied or cut from an application program. Unless the user updates the clipboard by copying or cutting new data or loses the latest copied or cut data by turning off a computer, without saving the latest copied or cut data in the clipboard as a file, the user can paste the latest copied or cut data in the clipboard in another program many times.

FIG. 1 is a block diagram illustrating a computer system 100 supporting a clipboard, according to related art.

The computer system 100 includes a CPU 110, a storage medium 120 such as hard discs or read only memory (ROMs), an output device 130 such as a monitor, an input device 140 such as a keyboard or mouse, and a main memory 150 such as random access memory (RAMs).

The main memory 150 loads an operating system program 151 that controls the whole computer system to execute application programs, a program 152 which executes a clipboard function, and a plurality of application programs 153, 154, and 155.

FIG. 2 is a flowchart showing a procedure of storing data in the program 152.

First, a user activates an application program on which data can be edited in step S210.

Next, the user highlights data on the activated application program in step S220.

Thereafter, the user selects a copy or cut command in the activated application program in step S230. For example, selecting the copy or cut command may involve selecting copy or cut in a toolbar of the activated application program, selecting a copy or cut command item in a dialogue box that pops up when a right button of a mouse is clicked, or using copy or cut softkeys, e.g., pressing Ctrl+C or Ctrl+X.

Whether data has been highlighted is determined in step S240. If data has been highlighted, the highlighted data is stored in the program 152 in step S250, irrespective of whether other data has already been stored in the program 152.

FIG. 3 is a flowchart showing a procedure of pasting data stored in the program 152 to another part of the activated application program or to another application program.

First, the user activates an application program in step S310.

Next, the user selects a paste command in the activated application program in step S320. For example, selecting the paste command may involve selecting paste in the toolbar of the activated application program, selecting a paste command item in the dialogue box that pops up when the right button of the mouse is clicked, or using paste softkeys, e.g., pressing Ctrl+V.

Thereafter, whether data has been stored in the program 152 is determined in step S330.

If data has been stored in the program 152, the data is pasted to a current cursor position or a highlighted position in step S340.

The latest copied or cut data can be pasted to any desired location, as many times as possible, until new data is stored in the program 152.

If new data is copied or cut, previously copied or cut data is replaced by new data. Thus, only the new data is stored in the program 152 and can be pasted.

In order to paste the previously copied or cut data, it is necessary to copy or cut the previously copied or cut data again and store it as new data in the program 152.

As describe above, the latest copied or cut data can be pasted many times, which makes it possible to avoid repetitive input operations of the same data. However, if new data is copied or cut, the previously copied or cut data is replaced by the new data. Thus, only the latest copied or cut data remains in the clipboard. If there is a plurality of sets of repetitive data to be copied or cut, a user has to repeat copy or cut and paste operations.

Korean Patent Application No. 1998-34093, titled "Computer system having a plurality of hot keys for a multi-clipboard function and operation method", discloses a computer system having hot keys for a multi-clipboard function. Such computer system includes a plurality of hot keys corresponding to different information stored in a clipboard of a program and stores at least one kind of information selected from the program in a storage medium using hot keys corresponding to the selected information. Thus, when the user desires to copy or cut the selected information, the selected information in the storage medium is transmitted from program to program by using hot keys. This invention has a problem in respect to a user interface in which the user must memorize the hot keys corresponding to the selected information or search for the location of the selected information in the storage medium.

Korean Patent Application No. 1999-48925, titled "Computer system having a multi-clipboard", discloses a computer system having a multi-clipboard. The multi-clipboard includes a plurality of clipboards and a clipboard header having data information about the plurality of clipboards. This system must include a user interface or a keyboard button to select data and activate a multi-clipboard displayer having a plurality of display regions to show copied or cut data. In other words, an additional means for operating hardware or software is required to execute a multi-clipboard function.

SUMMARY OF THE INVENTION

An aspect of the present invention provides an apparatus and method of executing a clipboard, which provide a user-friendly multi-clipboard function based on a general clipboard, without the need for any additional software or hardware.

According to an aspect of the present invention, there is provided an apparatus for executing a multi-clipboard. The apparatus comprises a basic clipboard and multi-clipboard, a timer, a basic clipboard executing unit, and a multi-clipboard executing unit. In the basic clipboard and multi-clipboard, data is stored by implementing a copy or cut operation. The timer counts an amount of time after a paste menu is activated. The basic clipboard executing unit pastes the data stored in the basic clipboard if the paste menu is selected before the amount of time counted by the timer is not greater than a predetermined amount of time. The multi-clipboard executing unit displays the data stored in the multi-clipboard if the paste menu is selected after the amount of time counted by the timer is greater than the predetermined amount of time.

Preferably, but not necessarily, if a user input indicating a user's selection of one item of the displayed data is received, the multi-clipboard executing unit pastes the selected item of the displayed data.

Preferably, but not necessarily, the multi-clipboard executing unit displays the data stored in the multi-clipboard in an order in which the data is stored.

Preferably, but not necessarily, the latest copied or cut data is stored in the basic clipboard.

According to another aspect of the present invention, there is provided a method of executing a multi-clipboard. The method comprises determining whether a predetermined amount of time has passed after a paste menu is activated, pasting data stored in a basic clipboard if a signal indicating a user's selection to the paste menu is received before the predetermined amount of time has passed, and displaying data stored in a multi-clipboard if the predetermined amount of time has passed.

Preferably, but not necessarily, the method further comprises if a user input indicating a user's selection of one item of the displayed data is received, pasting the selected item of the displayed data.

Preferably, but not necessarily, the latest copied or cut data is stored in the basic clipboard.

Preferably, but not necessarily, in displaying of data stored in the multi-clipboard, the data stored in the multi-clipboard is displayed if the predetermined amount of time has passed.

BRIEF DESCRIPTION OF THE DRAWINGS

The above and other aspects and advantages of the present invention will become more apparent by describing in detail exemplary embodiments thereof with reference to the attached drawings in which:

FIG. 8 is a view of a window where data of a multi-clipboard is displayed after a predetermined amount of time has passed from when the paste is activated, according to an exemplary embodiment of the present invention.

DETAILED DESCRIPTION OF EXEMPLARY EMBODIMENTS OF THE INVENTION

Figure 1:
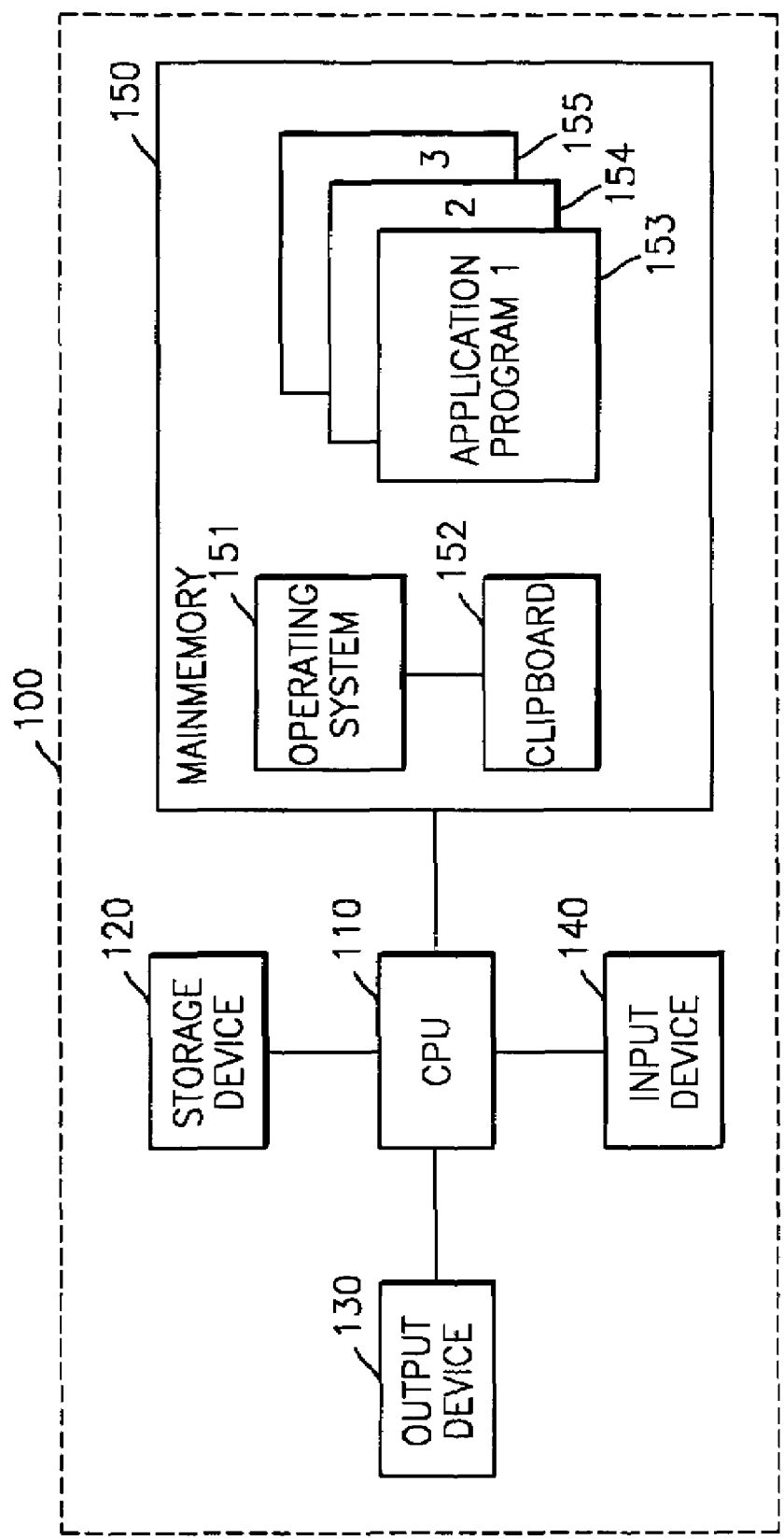
FIG. 1 is a block diagram illustrating a computer system that can execute a clipboard, according to related art.
Figure 2:
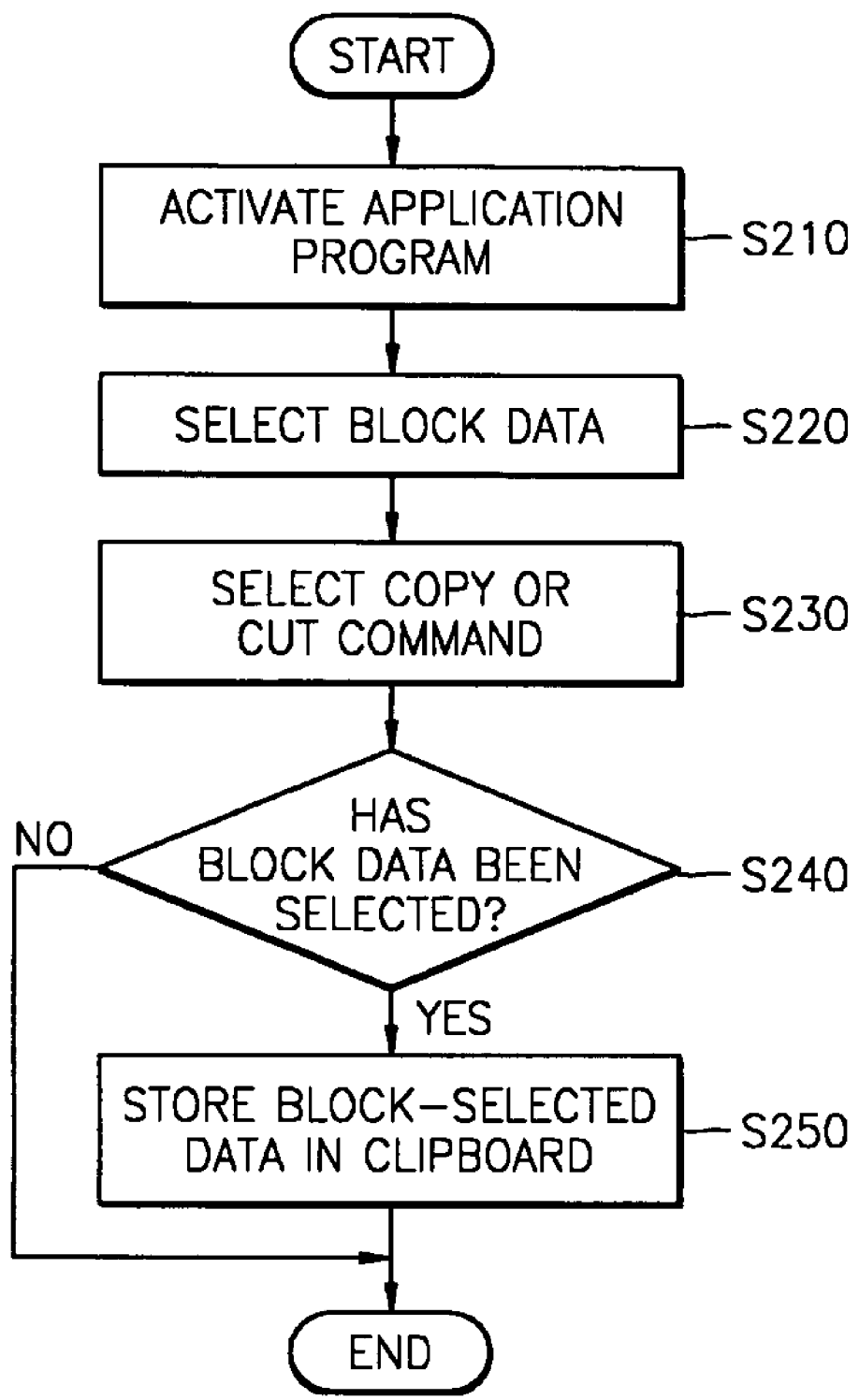
FIG. 2 is a flowchart showing a procedure of implementing a copy or cut operation by using the clipboard, according to prior art.
Figure 3:
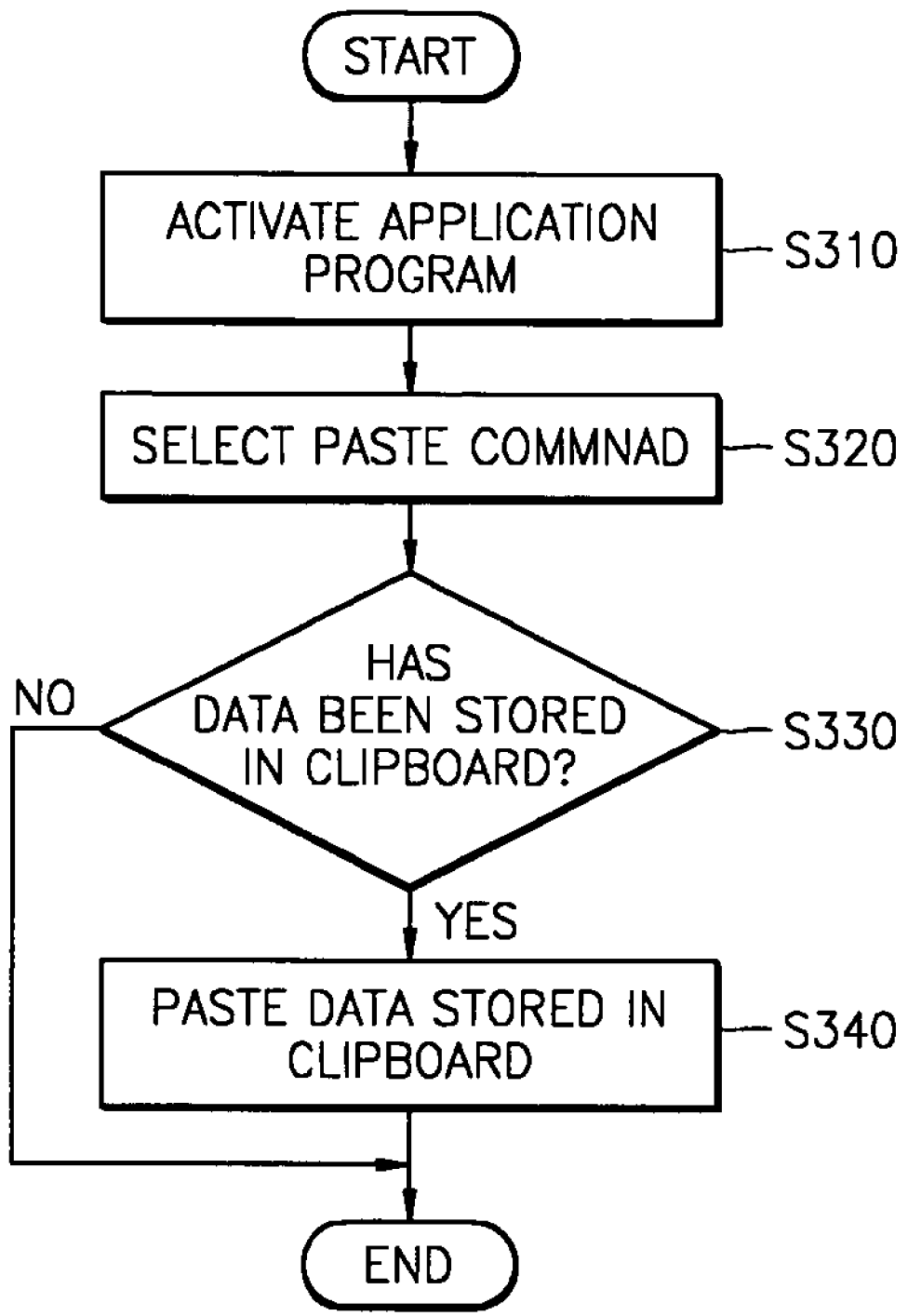
FIG. 3 is a flowchart showing a procedure of implementing a paste operation by using the clipboard, according to prior art.

The present invention will now be described more fully with reference to the accompanying drawings, in which exemplary embodiments of the invention are shown. To facilitate understanding, identical reference numerals have been used, where possible, to designate identical elements that are common among the figures.

Figure 4:
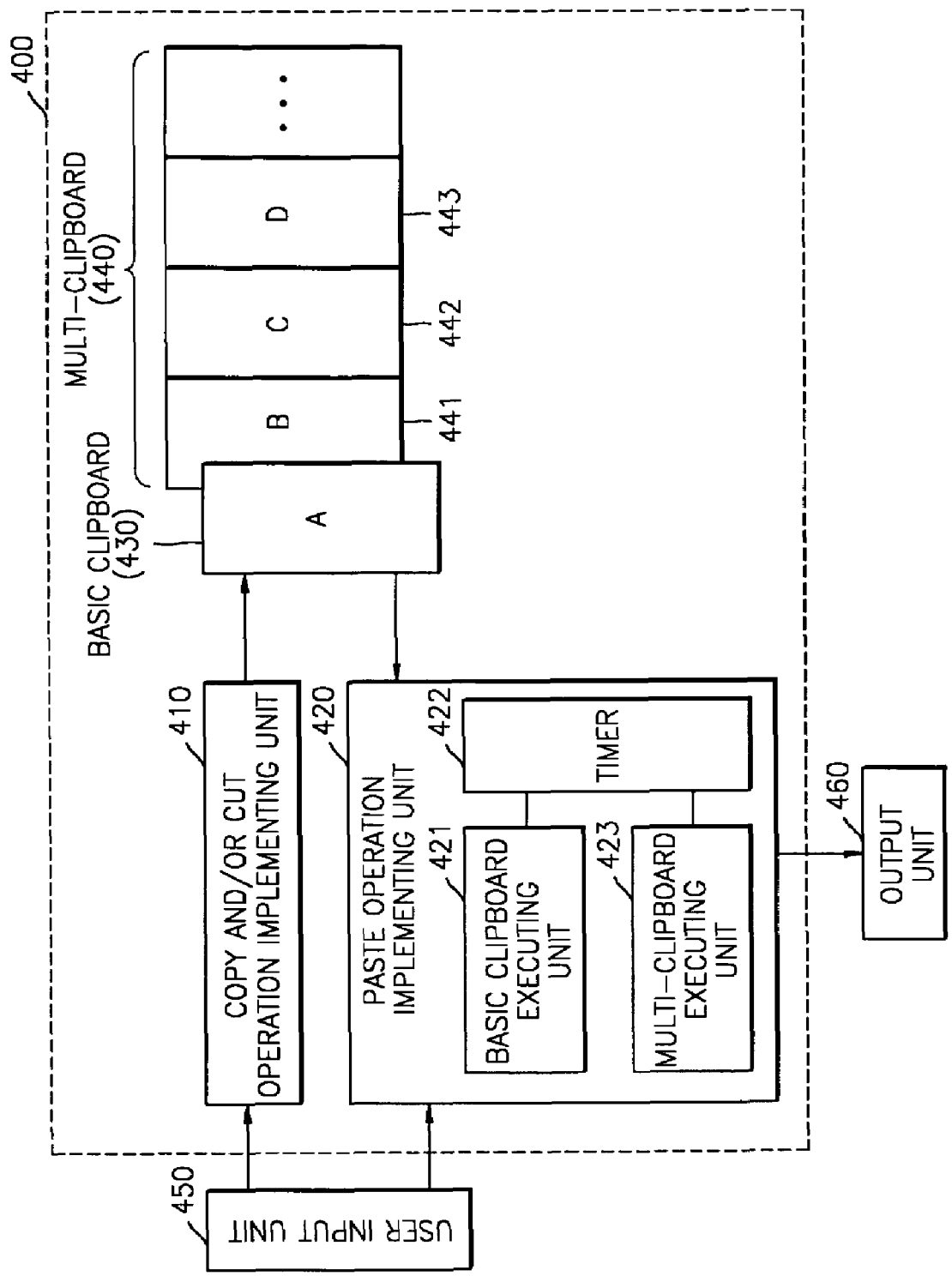
FIG. 4 is a block diagram illustrating a computer system including an apparatus for executing the clipboard, according to an exemplary embodiment of the present invention.

FIG. 4 is a block diagram illustrating a computer system including an apparatus for executing a clipboard 400 according to the present invention. The computer system including the apparatus for executing the clipboard 400 has the same configuration as the computer system 100 in FIG. 1. However, FIG. 4 focuses on elements related to the execution of the clipboard.

The computer system includes the apparatus for executing the clipboard 400 which executes a clipboard function, a user input unit 450 through which a user inputs data, such as a mouse or keyboard, and an output unit 460 such as a monitor.

The apparatus for executing the clipboard 400 includes a copy and/or cut operation implementing unit 410, a paste operation implementing unit 420, a basic clipboard 430, and a multi-clipboard 440. The multi-clipboard 440 includes clipboard portions 441, 442, 443.

The copy and/or cut operation implementing unit 410 receives a user input from the user input unit 450, implements a copy or cut operation, and stores highlighted data in the basic clipboard 430 or the multi-clipboard 440.

The paste operation implementing unit 420 receives the user input from the user input unit 450 and moves data stored in the basic clipboard 430 or the multi-clipboard 440 to a current cursor position or highlighted position. More specifically, the paste operation implementing unit 420 includes a timer 422, a basic clipboard executing unit 421, and a multi-clipboard executing unit 423. The timer 422 counts an amount of time from when the user input is received. The basic clipboard executing unit 421 executes data stored in the basic clipboard 430 if the amount of time counted by the timer 422 is not greater than the predetermined amount of time, when paste softkeys such as Ctrl+V are used. The multi-clipboard executing unit 423 executes data stored in the multi-clipboard 440 if the amount of time counted by the timer 422 is greater than the predetermined amount of time.

Here, the multi-clipboard 440 may be defined as a complementary program or complementary window which is dependent on or can arbitrate compatibility between application programs supported by an operating system. Preferably, but not necessarily, the multi-clipboard 440 can flexibly manage a region in which data is stored and limit the size of the region with respect to the options in the system configuration.

In the present invention, it is possible to simply execute the multi-clipboard 440, without additional hardware or complicated user operations, by including the timer 422 in the paste operation implementing unit 420.

Figure 5:
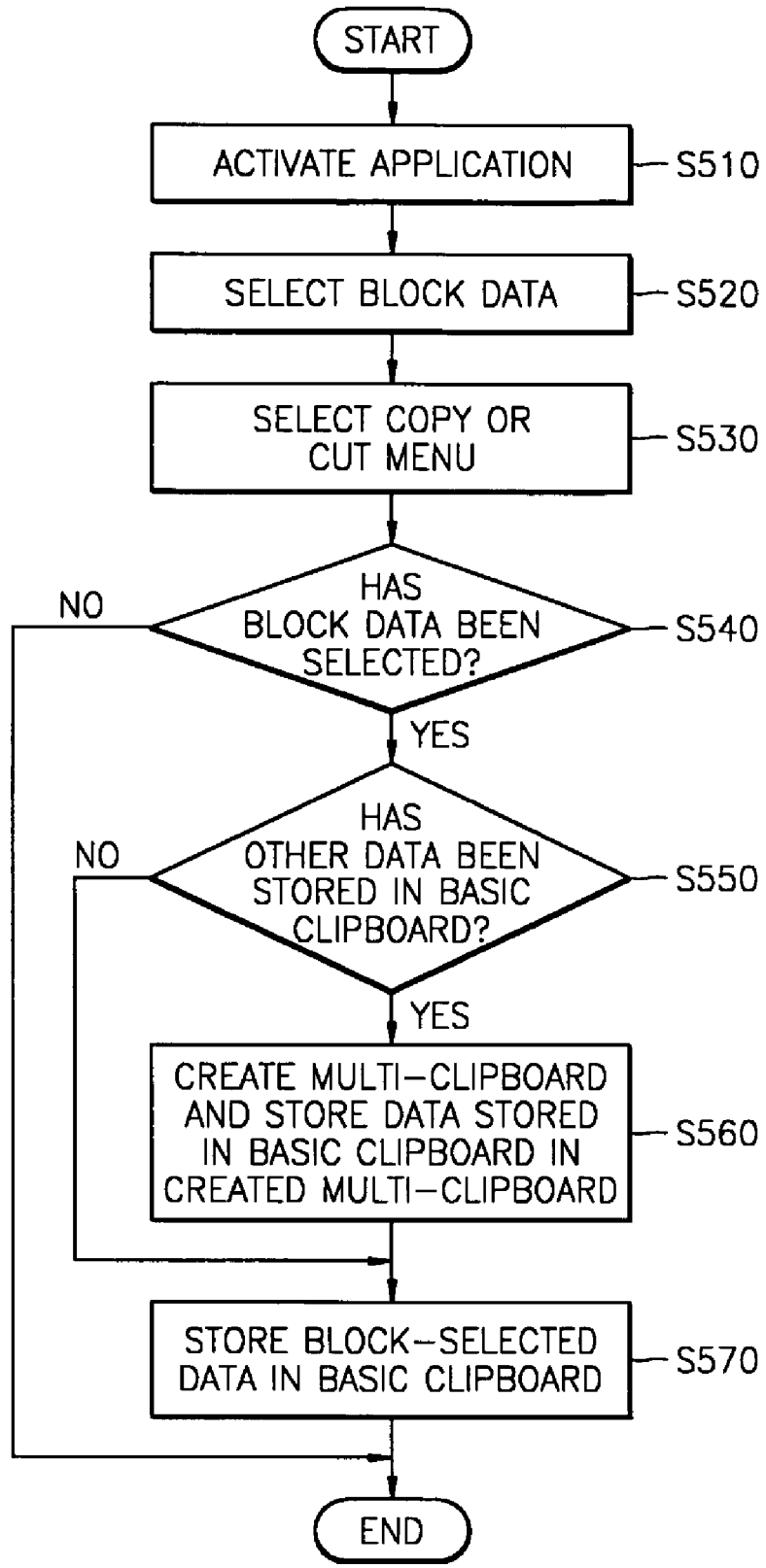
FIG. 5 is a flowchart showing a procedure of implementing the copy or cut operation by using the clipboard, according to an exemplary embodiment of the present invention.

Hereinafter, a procedure of implementing a copy or cut operation by using the basic clipboard 430 or the multi-clipboard 440 according to the present invention will be described with reference to FIG. 5.

First, a user activates an application program on which the copy or cut operation will be implemented in step S510.

Next, the user opens a window of a text to be edited on the application program and highlights data to be copied or cut in step S520.

The user selects copy or cut in step S530. For example, selecting copy or cut may involve selecting copy or cut in a toolbar, selecting a copy or cut command item in a dialogue box that pops up when a right button of a mouse is clicked, or using copy or cut softkeys, e.g., pressing Ctrl+C or Ctrl+X.

A signal indicating a user's selection of a copy or cut operation is received by the copy and/or cut implementing unit 410 of the apparatus for executing the clipboard 400 through the user input unit 450. Then, the copy and/or cut implementing unit 410 determines whether data has been highlighted in step S540. If data has not been highlighted, the copy and/or cut implementing unit 410 completes the copy or cut operation. If data has been highlighted, the copy and/or cut implementing unit 410 determines whether other data has been stored in the basic clipboard 430 in step S550.

If other data has not been stored in the basic clipboard 430, the copy and/or cut implementing unit 410 stores the highlighted data in the basic clipboard 430 in step S570. If other data has been stored in the basic clipboard 430, the copy and/or cut implementing unit 410 creates the multi-clipboard 440, stores the data stored in the basic clipboard 430 in the created multi-clipboard 440 in step S560, and stores the highlighted data in the basic clipboard 430 in step S570.

If other data has been stored in the basic clipboard 430, and if other data has been stored in the multi-clipboard 440, the copy and/or cut implementing unit 410 stores the data stored in the basic clipboard 430 in the multi-clipboard 440 after extending the multi-clipboard 440 in step S560 and stores the highlighted data in the basic clipboard 430 in step S570. Here, data stored in the multi-clipboard 440 is arranged in the same order that each of data has been stored until that point. Thus, the basic clipboard 430 can hold the latest copied or cut data every time.

Figure 6:
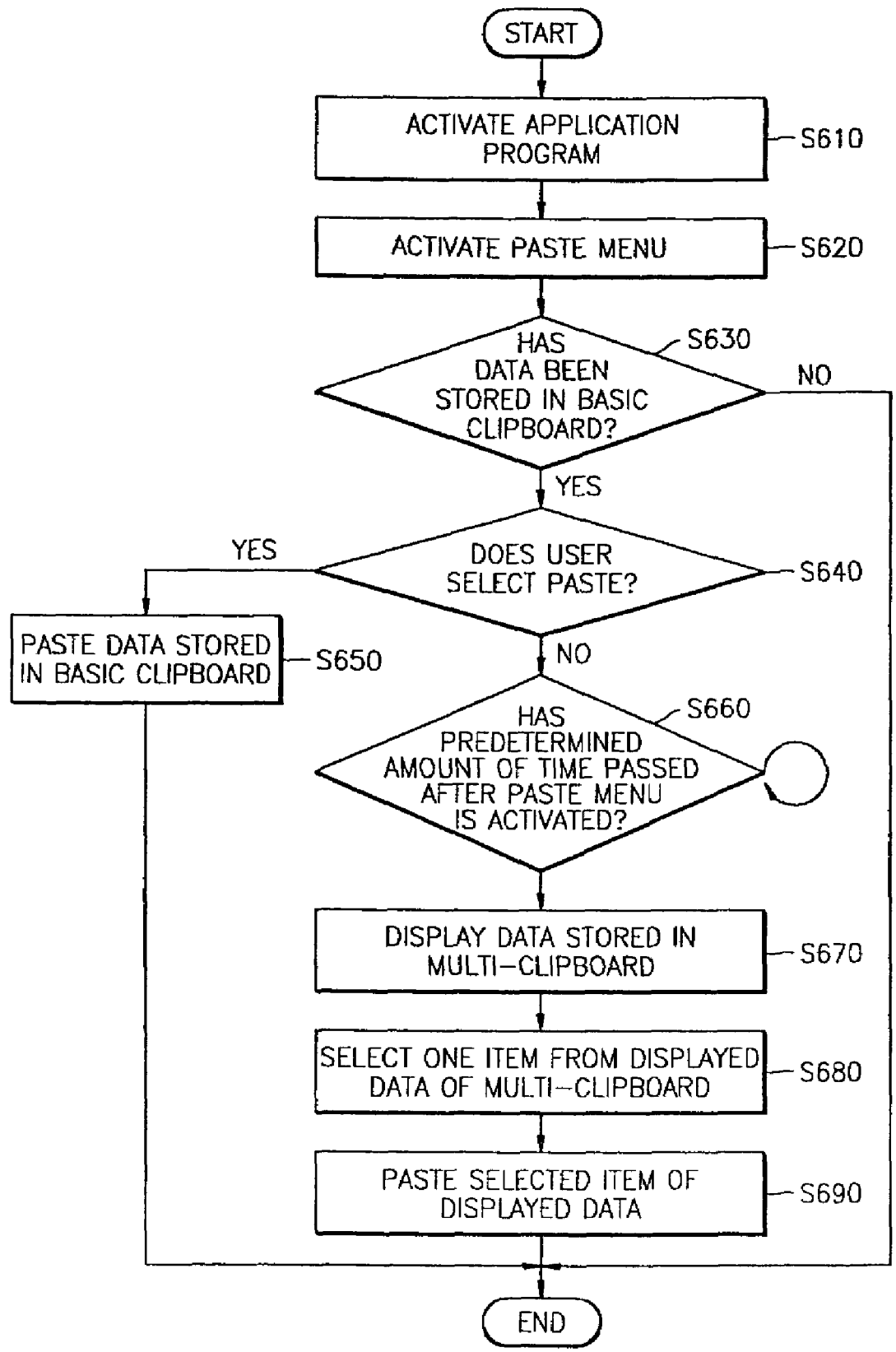
FIG. 6 is a flowchart showing a procedure of implementing the paste operation by using the clipboard, according to an exemplary embodiment of the present invention.

Hereinafter, a procedure of pasting data stored in the basic clipboard 430 or the multi-clipboard 440 in an application program to a current text or another text on the same application program or to a text on another application program will be described with reference to FIG. 6.

First, the user activates an application program on which a paste operation is implemented in step S610.

Figure 7:
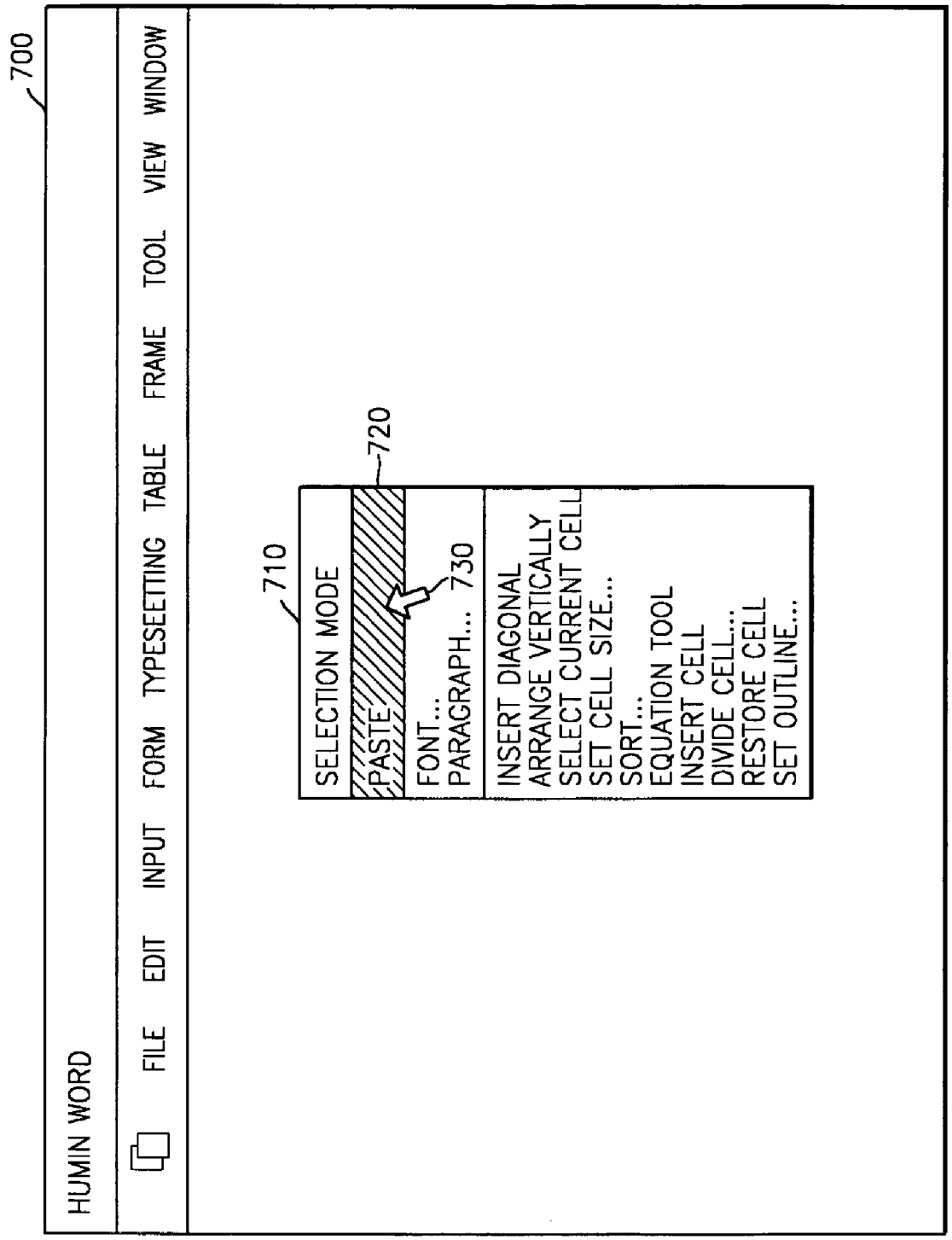
FIG. 7 is a view of a window where a paste is activated, according to an exemplary embodiment of the present invention.

Next, the user opens a window of a text to which data will be pasted, positions a cursor to a desired location or highlights the desired location, and activates a paste by clicking a mouse button or selecting a menu atop an opened window, in step S620. The user may activate paste by using paste softkey Ctrl+V. Referring to FIG. 7, activating paste may involve positioning a mouse pointer 730 to paste 720 in a menu bar 710 that pops up when a right button of the mouse is clicked or positioning the mouse pointer 730 to a paste (not shown) offered under the "Edit" menu (not shown) atop an opened window 700.

The timer 422 of the paste operation implementing unit 420 starts a counting operation from when the paste 720 is activated.

Thereafter, the basic clipboard executing unit 421 determines whether other data has been stored in the basic clipboard 430 in step S630. If data has not been stored in the basic clipboard 430, the basic clipboard executing unit 421 completes its operation. If data has been stored in the basic clipboard 430, the basic clipboard executing unit 421 determines whether the user selects the activated paste 720, in step S640. In other words, if the user selects the activated paste 720 before a predetermined amount of time has passed from when the timer 422 starts the counting operation, the basic clipboard executing unit pastes data stored in the basic clipboard 430 to a desired location, in step S650.

If the user does not select the activated paste 720, the basic clipboard executing unit 421 determines whether the predetermined amount of time has passed from when the paste 720 is activated, in step S660. The basic clipboard executing unit 421 may easily complete the determination by checking the amount of time counted by the timer 422.

If the predetermined amount of time has passed, the multi-clipboard executing unit 423 displays data stored in the multi-clipboard 430 on the output unit 460 in step S670. FIG. 8 shows a window 800 where the data stored in the multi-clipboard 430 is displayed. Data 830 of the multi-clipboard 430 is displayed beside paste 820. The displayed data 830 may be a portion of all of the data stored in the multi-clipboard 430. In addition, the displayed data 830 can be displayed after being arranged in the same order that each item of the displayed data 830 is stored. Here, the displayed data 830 includes five items 831, 832, 833, 834, and 835.

If the user selects one item of the displayed data 830 of the multi-clipboard 430 in step S680, the multi-clipboard executing unit 423 receives a user input indicating the user's selection and pastes the selected item of the multi-clipboard 430 to a desired location, in step S690.

If the user presses a paste softkey Ctrl+V after positioning a cursor or highlighting data, data stored in the basic clipboard 430 is pasted to the cursor position or highlighted position without the need for the counting operation of the timer 422.

According to the present invention, it is possible to provide a user-friendly multi-clipboard by extending a general graphic user interface without the need for additional means or user interface. Also, since a multi-clipboard function is provided in response to a user's request, that is, after a predetermined amount of time has passed as a counted result of a timer, it is possible to reduce a load on a computer system or any delay, which may occur when the user accesses data of the multi-clipboard to use the latest data stored in the multi-clipboard by using softkeys or selecting an operation within a predetermined amount of time.

While the present invention has been particularly shown and described with reference to exemplary embodiments thereof, it will be understood by those of ordinary skill in the art that various changes in form and details may be made therein without departing form the spirit and scope of the invention as defined by the appended claims and their equivalents.

What is claimed is:

1. An apparatus for executing a multi-clipboard, the apparatus comprising:
   a basic clipboard and a multi-clipboard in which data is stored by implementing a copy or cut operation, wherein latest copied or cut data is stored in the basic clipboard, and other data stored in the basic clipboard prior to said latest copied or cut data being stored in the basic clipboard is automatically stored in the multi-clipboard in response to said latest copied or cut data being stored in the basic clipboard;
a timer which counts an amount of time after a paste menu is activated;
a basic clipboard executing unit which pastes the data stored in the basic clipboard if the paste menu is selected before the amount of time counted by the timer is greater than a predetermined amount of time; and
a multi-clipboard executing unit which displays the data, including a plurality of items, stored in the multi-clipboard on an output unit when the amount of time counted by the timer reaches the predetermined amount of time, wherein, if a user input indicating a user's selection of one item of the plurality of items included in the displayed data is received, the multi-clipboard executing unit pastes the selected item of the displayed data.

2. The apparatus of claim 1, wherein the multi-clipboard executing unit displays the data stored in the multi-clipboard in an order in which the data is stored.

3. A method of executing a multi-clipboard, the method comprising:
   (a) determining whether a predetermined amount of time has passed after a paste menu is activated;
   (b) pasting data stored in a basic clipboard if a signal indicating a user's selection to the paste menu is received before the predetermined amount of time has passed; and
   (c) displaying data, including a plurality of items, stored in a multi-clipboard on an output unit when the predetermined amount of time has passed, wherein latest copied or cut data is stored in the basic clipboard and other data stored in the basic clipboard prior to said latest copied or cut data being stored in the basic clipboard is automatically stored in the multi-clipboard in response to said latest copied or cut data being stored in the basic clipboard; and
   (d) if a user input indicating a user's selection of one item of the plurality of items included in the displayed data is received, pasting the selected item of the displayed data.

4. The method of claim 3, wherein step (c) further comprises arranging the data stored in the multi-clipboard in the same order that each item of the data is stored.

5. The method of claim 3, wherein the method further comprises (e) pasting the data stored in the basic clipboard by using paste softkeys.

* * * * *